United States Patent
Kuo et al.

(10) Patent No.: US 10,649,225 B2
(45) Date of Patent: May 12, 2020

(54) LIGHT REDIRECTING FILM

(71) Applicant: BenQ Materials Corporation, Taoyuan (TW)

(72) Inventors: Chen-Kuan Kuo, Taoyuan (TW); Cyun-Tai Hong, Taoyuan (TW); Fung-Hsu Wu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 138 days.

(21) Appl. No.: 15/821,893

(22) Filed: Nov. 24, 2017

(65) Prior Publication Data
US 2019/0025480 A1 Jan. 24, 2019

Related U.S. Application Data

(60) Provisional application No. 62/535,145, filed on Jul. 20, 2017, provisional application No. 62/535,154, filed on Jul. 20, 2017.

(51) Int. Cl.
| | |
|---|---|
| *G02B 5/18* | (2006.01) |
| *G02B 27/42* | (2006.01) |
| *G02B 1/04* | (2006.01) |
| *G02B 5/02* | (2006.01) |

(52) U.S. Cl.
CPC ............ *G02B 27/4211* (2013.01); *G02B 1/04* (2013.01); *G02B 5/0252* (2013.01); *G02B 5/0278* (2013.01); *G02B 5/1823* (2013.01); *G02B 5/1842* (2013.01); *G02B 5/1847* (2013.01); *G02B 5/1852* (2013.01); *G02B 5/1866* (2013.01); *G02B 27/4272* (2013.01)

(58) Field of Classification Search
CPC .... G02B 5/1871; G02B 5/3083; G02F 1/1335
USPC ................ 359/576, 569, 566; 348/291, 342; 349/112, 62
See application file for complete search history.

(56) References Cited

U.S. PATENT DOCUMENTS

| | | | | |
|---|---|---|---|---|
| 4,795,236 A | * | 1/1989 | Ise ........................ | G02B 5/1871 348/291 |
| 5,280,388 A | * | 1/1994 | Okayama ............. | G02B 5/1871 348/342 |
| 5,847,877 A | * | 12/1998 | Imamura ............... | G02B 5/1876 359/566 |
| 6,147,732 A | * | 11/2000 | Aoyama ............. | G02B 5/3083 349/112 |

(Continued)

*Primary Examiner* — Audrey Y Chang (57) ABSTRACT

A light redirecting film in a sandwich-laminated structure is provided. The light redirecting film comprises a first layer, a second layer; and an intermediate layer sandwiched between the first layer and the second layer. The intermediate layer includes a first grating surface having a plurality of first gratings extending in a first grating direction and a second grating surface opposite to the first grating surface having a plurality of second gratings extending in a second grating direction, wherein the first grating direction and the second grating direction cross each other at an angle of 90°±10°, and the first grating surface and the second grating surface of the intermediate layer are gap-filled and planarized with the first layer and the second layer respectively to generate the light redirecting film.

19 Claims, 5 Drawing Sheets

(56) References Cited

U.S. PATENT DOCUMENTS

| | | | | |
|---|---|---|---|---|
| 8,736,787 B2* | 5/2014 | Li | .................. | G02F 1/1335 |
| | | | | 349/62 |
| 2005/0151711 A1* | 7/2005 | Baek | .................. | G09G 3/2003 |
| | | | | 345/88 |

* cited by examiner

LIGHT REDIRECTING FILM

This application claims the benefit of U.S. provisional application Ser. No. 62/535,145, filed on Jul. 20, 2017, and U.S. provisional application Ser. No. 62/535,154, filed on Jul. 20, 2017, the subject matters of which are incorporated herein by reference.

BACKGROUND OF THE INVENTION

Field of the Invention

The invention relates in general to a light redirecting film, and more particularly relates to a light redirecting film for enhancing optical performance of a display, such as contrast ratio, color saturation and color accuracy at wide viewing angles.

Description of the Related Art

The displays with the features of high contrast, no gray level inversion, small color shift, high color accuracy, high brightness, high color richness, high color saturation, fast response speed and wide viewing angle are current market trends. The liquid crystal is a modulation material with a high efficiency refractive index used in the display product. However, the symmetries of the liquid crystal molecules at different viewing angles are different, and thus, the optical paths of a normal light and an oblique light penetrating through the liquid crystal in the display will be different. Therefore, general displays such as liquid crystal displays (LCDs) or organic light emitting diode (OLED) displays with materials of different illuminant wavelength and different intensity at different viewing angles are prone to appear color washout or gray-scale inversion phenomenon at wide viewing angles which result in lower contrast ratio or abnormal color performance of images.

Several approaches for improving the disadvantages of display have been proposed. For example, the equalized images at central viewing angles and at wide viewing angles of a display can be achieved by using a wide viewing angle film for a twisted nematic (TN) liquid crystal display, or by using a multi-domain vertical alignment (MVA) display, or by using a diffusion layer or a diffraction layer on the surface of display.

However, the wide viewing angle film for the TN liquid crystal display is expensive; the manufacturing process of MVA display is complicated and too costly, and the process yield is low; the diffusion layer is difficult to precisely control the light emitted from the different viewing angles of the display, and it is difficult for the diffraction layer to simultaneously control the different dimensional light paths with only a single diffraction structure layer.

Therefore, the present invention is to provide a light redirecting film with two-dimensional diffraction structure for display, such as LCD and OLED to reduce the color washout and/or gray-scale inversion phenomenon and enhance the performance of the display.

SUMMARY OF THE INVENTION

The present invention discloses a light redirecting film in a sandwich-laminated structure. The light redirecting film comprises a first layer; a second layer; and an intermediate layer sandwiched between the first layer and the second layer. The intermediate layer includes a first grating surface having a plurality of first gratings extending in a first grating direction and a second grating surface opposite to the first grating surface having a plurality of second gratings extending in a second grating direction, wherein the first grating direction and the second grating direction cross each other at an angle of 90°±10°. The first grating surface and the second grating surface of the intermediate layer are gap-filled and planarized with the first layer and the second layer respectively to generate the light redirecting film.

In an aspect of the light redirecting film of present invention, the first layer has a first refraction index of n1, the intermediate layer has of a second refraction index of n2, the second layer has a third refraction index of n3, and n1, n2 and n3 are all in the range of 1.4 to 1.7.

In another aspect of the light redirecting film of present invention, n2 is greater than n1 and n3.

In another aspect of the light redirecting film of present invention, n1 and n3 can be the same or different.

In another aspect of the light redirecting film of present invention, n2 and n1 is no less than 0.1 and no more than 0.3.

In another aspect of the light redirecting film of present invention, the difference of n2 and n3 is no less than 0.1 and no more than 0.3.

In another aspect of the light redirecting film of present invention, each of the first gratings has a width of w1, each of the second gratings has a width of w2, and w1 and w2 are independently in the range of 0.3 μm to 1.5 μm.

In another aspect of the light redirecting film of present invention, each of the first gratings has a depth of d1, each of the second gratings has a depth of d2, and d1 and d2 are independently in the range of 0.5 μm to 1.5 μm.

In another aspect of the light redirecting film of present invention, the grating gap of g1 between adjacent two of the first gratings and the grating gap of g2 between adjacent two of the second gratings are independently in the range of 0.3 μm to 1.5 μm.

In another aspect of the light redirecting film of present invention, the widths, the depths and the grating gaps of the first gratings and the second gratings can be the same or different.

In another aspect of the light redirecting film of present invention, the light redirecting film further comprises an optical film adhered to the light redirecting film, wherein the optical film is selected from one of a group consisting of a polarizing film, a hard-coating film, a low reflective film, an anti-reflective film, an anti-glaring film and a protective film or combinations thereof.

The above and other aspects of the invention will become better understood with regard to the following detailed description of the preferred but non-limiting embodiment(s). The following description is made with reference to the accompanying drawings.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings, the structure of the apparatus known only schematically depicted in figures.

Figure 1A:
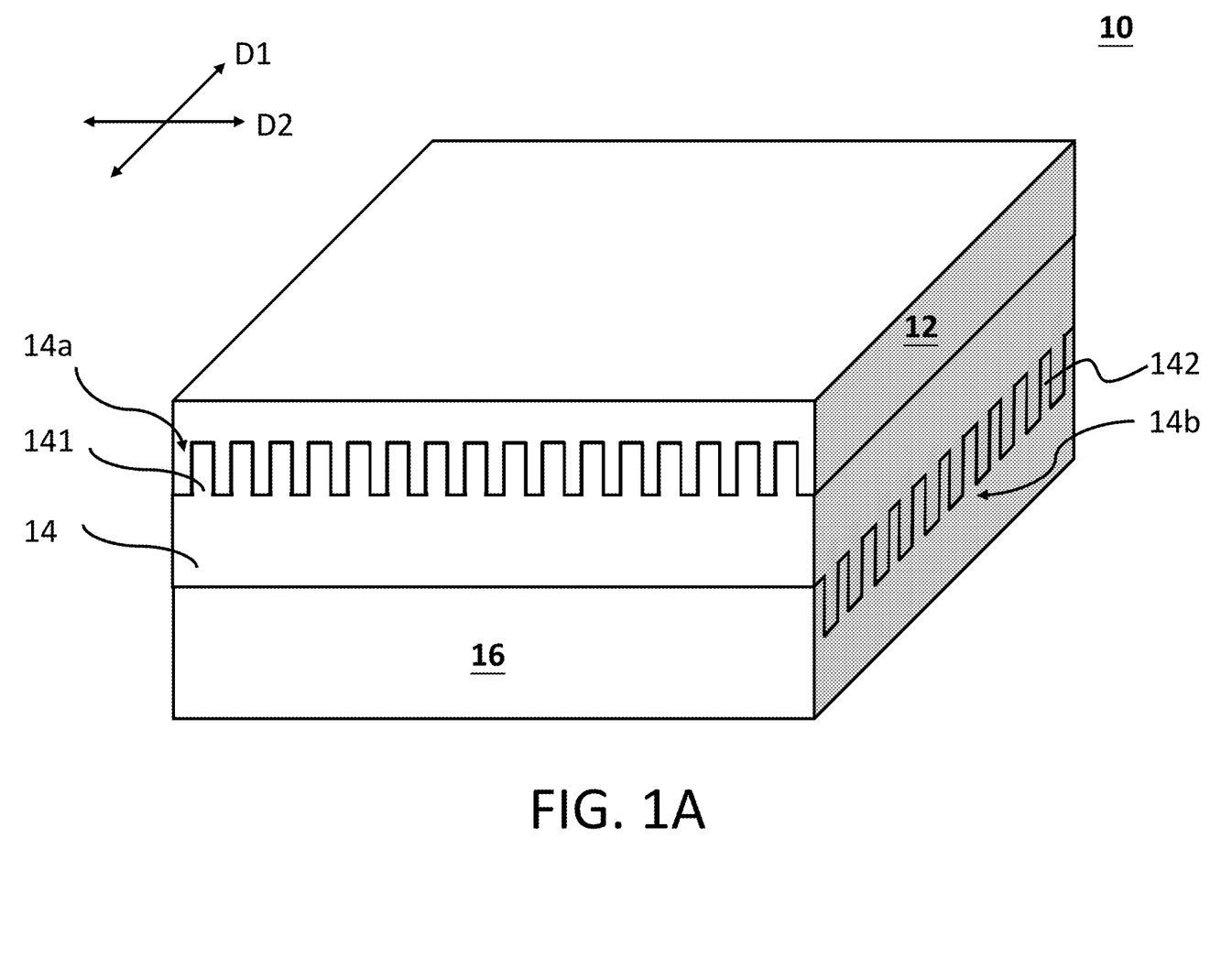
FIG. 1A is a stereoscopic perspective view of a light redirecting film of a preferred embodiment of the present invention.
Figure 1B:
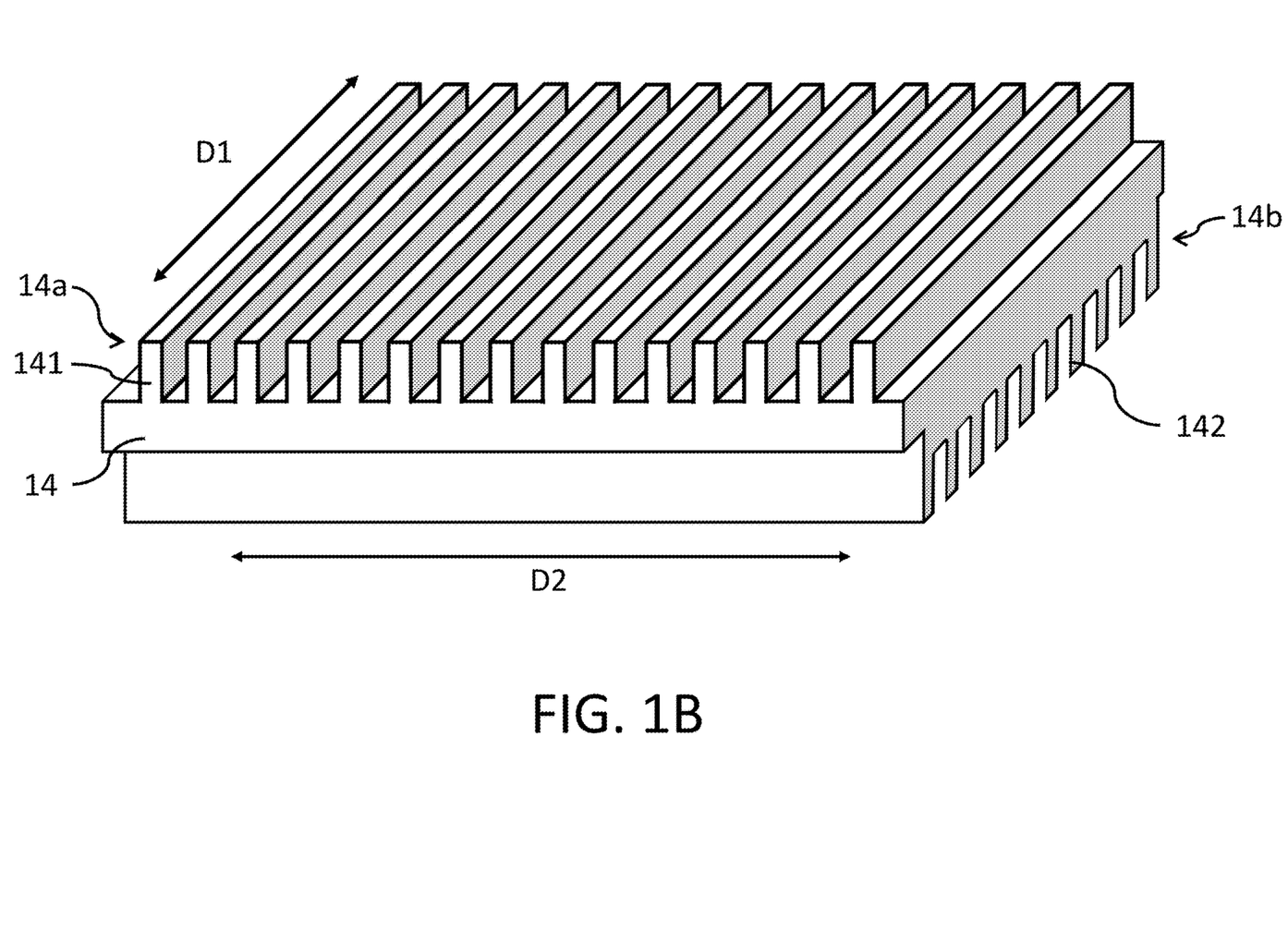
FIG. 1B is a stereoscopic perspective view of a first grating surface and a second grating surface of the intermediate layer of the light redirecting film as illustrated in FIG. 1A.

Referred to FIG. 1A and FIG. 1B, FIG. 1A shows a perspective view of a light redirecting film 10 which is in a sandwich-laminated structure. FIG. 1B shows a perspective view of a first grating surface and a second grating surface of an intermediate layer 14 of the light redirecting film 10 as illustrated in FIG. 1A. As shown in FIG. 1A, the light redirecting film 10 comprises a first layer 12, a second layer 16, and an intermediate layer 14 sandwiched between the first layer 12 and the second layer 16. As shown in FIG. 1B, the intermediate layer 14 includes a first grating surface 14a having a plurality of first gratings 141 extending in a first grating direction (D1) and a second grating surface 14b opposite to the first grating surface 14a having a plurality of second gratings 142 extending in a second grating direction (D2), wherein the first grating direction (D1) and the second grating direction (D2) cross each other at an angle of 90°±10°. The first grating surface 14a and the second grating surface 14b of the intermediate layer 14 are gap-filled and planarized with the first layer 12 and the second layer 16 respectively to generate the light redirecting film 10 as illustrated in FIG. 1A.

In an aspect of the light redirecting film of present invention, the first layer 12 has a first refraction index of n1, the intermediate layer 14 has a second refraction index of n2, the second layer 16 has a third refraction index of n3, and n1, n2 and n3 are all in the range of 1.4 to 1.7. The materials of the first layer 12, the intermediate layer 14 and the second layer 16 can be a UV curable resin or a thermal curable resin, such as acrylic resin, silicone resin, polyurethane resin, epoxy resin or combinations thereof.

In another aspect of the light redirecting film of present invention, n2 is higher than n1 and n3.

In another aspect of the light redirecting film of present invention, n1 and n3 can be the same or different.

In another aspect of the light redirecting film of present invention, the difference of n2 and n1 is no less than 0.1 and no more than 0.3.

In another aspect of the light redirecting film of present invention, the difference of n2 and n3 is no less than 0.1 and no more than 0.3.

Figures 2A, 2B:
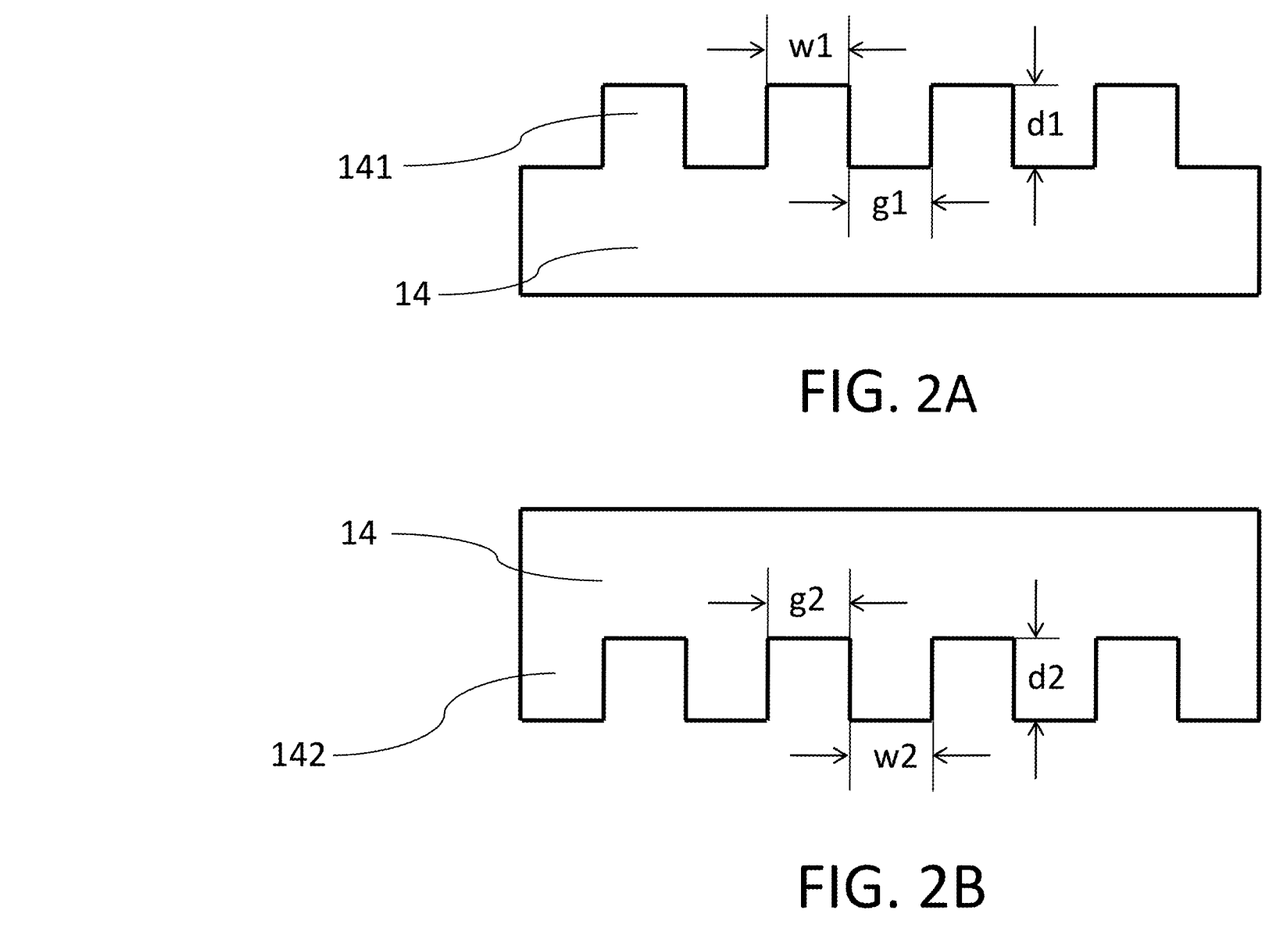
FIG. 2A is a cross-sectional view along with D2 direction of the first grating surface of the intermediate layer as illustrated in FIG. 1B.
FIG. 2B is a cross-sectional view along with D1 direction of the second grating surface of the intermediate layer as illustrated in FIG. 1B.

The dimensions of the first gratings 141 of the first grating surface 14a and the second gratings 142 of the second grating surface 14b can be determined by the demands of different designs of displays. Referred to FIG. 1B, FIG. 2A, and FIG. 2B, FIG. 2A shows a cross-sectional view along with D2 direction of the first grating surface 14a of the intermediate layer 14 as illustrated in FIG. 1B. As shown in FIG. 2A, in another aspect of the light redirecting film of present invention, each of the first gratings 141 of the first grating surface 14a has a width of w1 in the range of 0.3 μm to 1.5 μm, and preferably in the range of 0.4 μm to 0.6 μm, a depth of d1 in the range of 0.5 μm to 1.5 μm, and preferably in the range of 0.7 μm to 1.3 μm. A grating gap of g1 between adjacent two of the first gratings 141 is in the range of 0.3 μm to 1.5 μm, and preferably in the range of 0.4 μm to 0.6 μm. The first gratings 141 of the first grating surface 14a can have the same or different dimensions, and can be sequentially and periodically or randomly formed on the first grating surface 14a of the intermediate layer 14.

FIG. 2B shows a cross-sectional view along with D1 direction of the second grating surface 14b of the intermediate layer 14 as illustrated in FIG. 1B. As shown in FIG. 2B, in another aspect of the light redirecting film of present invention, each of the second gratings 142 of the second grating surface 14b has a width of w2 in the range of 0.3 μm to 1.5 μm, and preferably in the range of 0.4 μm to 0.6 μm, and a depth of d2 in the range of 0.5 μm to 1.5 μm, and preferably in the range of 0.7 μm to 1.3 μm. A grating gap of g2 between adjacent two of the second gratings 142 is in the range of 0.3 μm to 1.5 μm, and preferably in the range of 0.4 μm to 0.6 μm. The second gratings 142 of the second grating surface 14b can have the same or different dimensions, and can be sequentially and periodically or randomly formed on the second grating surface 14b of the intermediate layer 14.

The first grating surface 14a and the second grating surface 14b of the intermediate layer 14 can be adapted to improve the color washout or gray-scale inversion phenomenon at horizontal viewing angles and vertical viewing angles of the display respectively. Furthermore, the patterns and dimension settings, such as width, depth and grating gap of the first gratings 141 and the second gratings 142 can be the same or different from each other depending on the demands of different designs of displays. In an embodiment of the invention, the widths, the depths and the grating gaps of the first gratings 141 of the first grating surface 14a and the second gratings 142 of the second grating surface 14b are the same. In another embodiment of the invention, the widths, the depths and the grating gaps of the first gratings 141 of the first grating surface 14a and the second gratings 142 of the second grating surface 14b are different.

The light emitted from each pixel of the display, such as LCD, can pass through the first grating surface 14a and the second grating surface 14b of the intermediate layer 14 respectively. Therefore, the light emitted from each pixel of the display can be redirected to the desired horizontal and vertical viewing angles simultaneously. In addition, compared to a light redirecting film consisted of two laminated conventional diffraction layers, the light redirecting film of the present disclosure may omit individual encapsulation layers for each conventional diffraction layer, and simplify the design for different refractive indexes of materials of the different layers. Therefore, the light redirecting film of the integrated laminate structure can also reduce the influence on the light transmittance of display.

In a further preferred embodiment of the light redirecting film 10 of the present invention, the present light redirecting film 10 is able to be adhered to at least one optical film (not shown) such as, for example, polarizing film, hard-coating film, low reflective film, anti-reflective film, anti-glaring film and protective film or to a display panel directly.

Figure 3A:
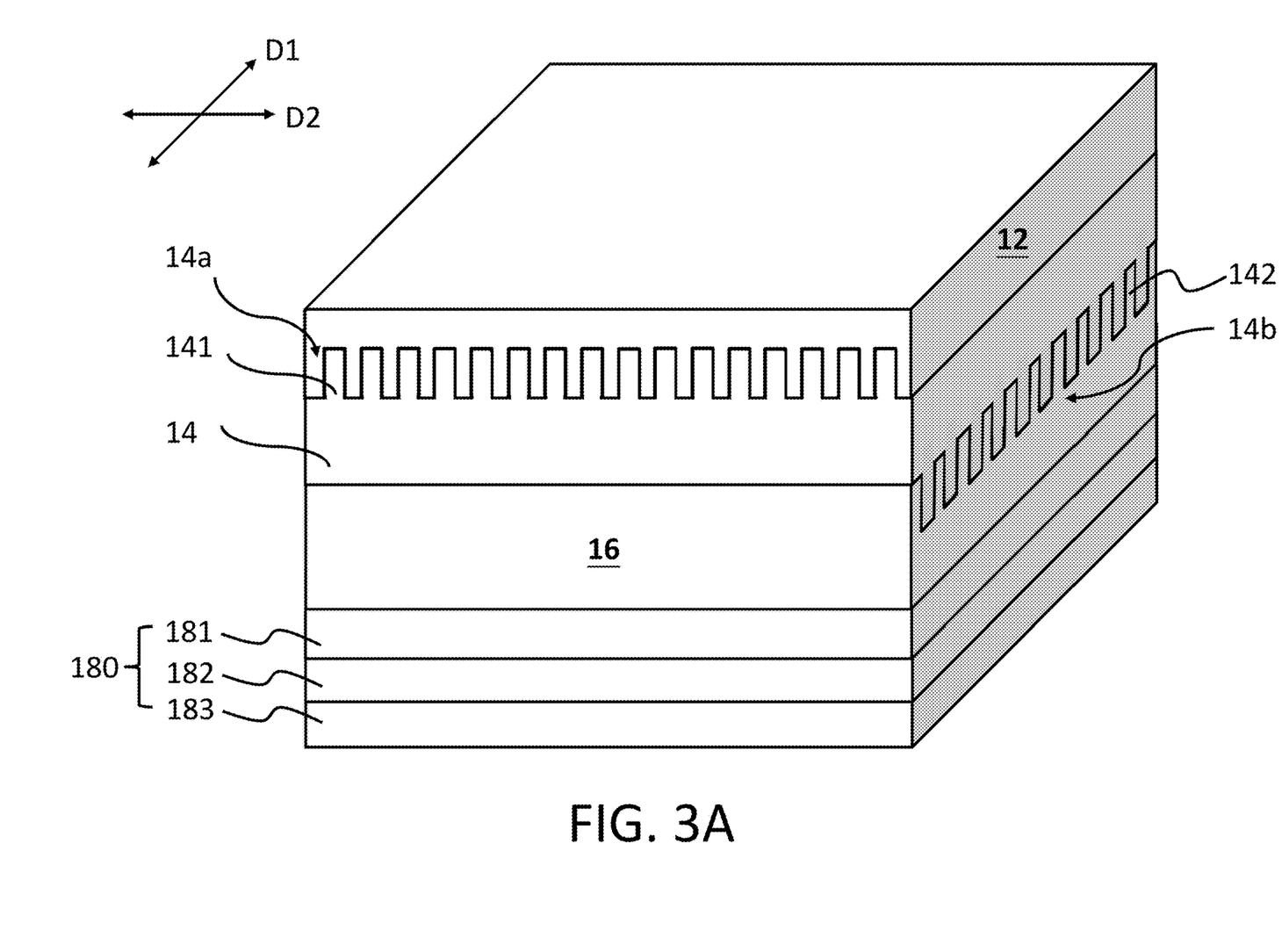
FIG. 3A is a stereoscopic perspective view of another light redirecting film of a preferred embodiment of the present invention.

Referred to FIG. 3A, FIG. 3A is a stereoscopic perspective view of another light redirecting film of another preferred embodiment of the present invention. A polarizer 18 can be adhered to the second layer 16 of the light redirecting film 10 of the present invention. The polarizer 18 comprises a first protecting layer 181, a polarizing layer 182 and a second protecting layer 183. The light redirecting film 10 of the present invention can be adhered to a protecting layer 181 of the conventional polarizer 18 by an adhesive layer (not shown), and the direction of the absorption axis (not shown) of the polarizing layer 182 is parallel to the first grating direction (D1) of the first gratings or the second grating direction (D2) of the second gratings. In another embodiment of the present invention, the light redirecting film 10 can also be adhered to a conventional polarizer by a curable second layer 16 without other adhesive layer.

Figure 3B:
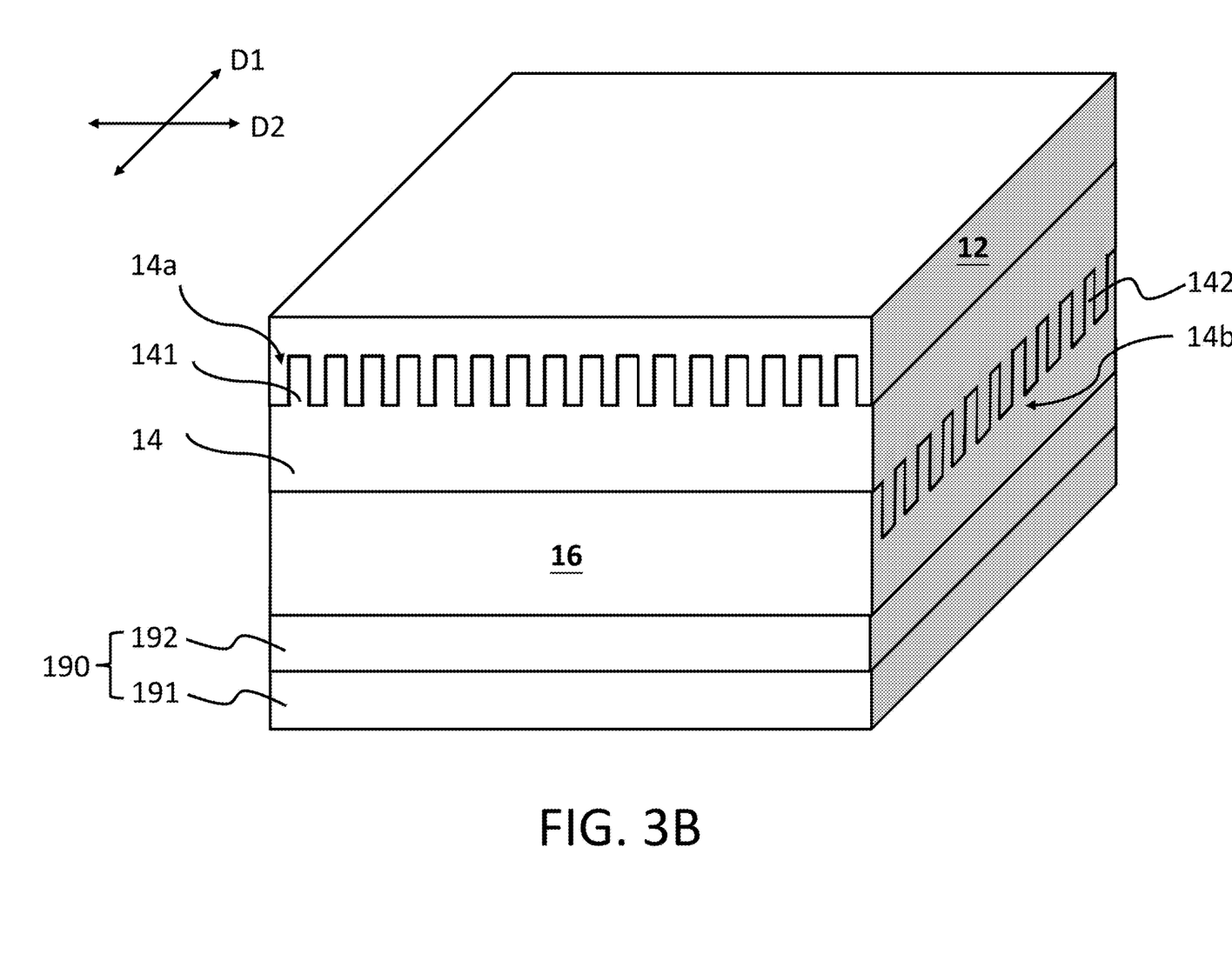
FIG. 3B is a stereoscopic perspective view of another light redirecting film of a preferred embodiment of the present invention.

Referred to FIG. 3B, FIG. 3B is a stereoscopic perspective view of another light redirecting film of a preferred embodiment of the present invention. The light redirecting film 10 is used as one of the protective layer of an integrated polarizer 19. For example, the integrated polarizer 19 comprises a first protecting layer 191 and a polarizing layer 192, and the light redirecting film 10 is adhered to the polarizing layer 192 of the integrated polarizer 19 by the second layer 16, and therefore, the light redirecting film 10 can be directly substituted and used as one protective layer of the integrated polarizer 19.

EXAMPLE

Example 1

In Example 1, a light redirecting film 10 is provided. The light redirecting film 10 of this example comprises a intermediate layer 14 having a first grating surface 14a and a second grating surface 14b opposite to each other, and a plurality of grating structures, such as gratings 1~11, with various dimension and patterns as listed in Table 1 are sequential and periodically formed on the first grating surface 14a and the second grating surface 14b respectively, wherein the first grating surface 14a and the second grating surface 14b of the intermediate layer 14 are of the same dimensions and patterns, except that the first grating direction (D1) of the first gratings 141 and the second grating direction (D2) of the second gratings 142 cross over at an angle of 90°. The refraction indexes of the first layer 12, the intermediate layer 14 and the second layer of the light redirecting film are 1.5, 1.6 and 1.5, respectively. More or less gratings formed on the first grating surface 14a and the second grating surface 14b can also be generated according to this present invention.

TABLE 1

Dimensions of gratings on the first grating surface and the second grating surface of the intermediate layer of the light redirecting film

| Dimensions of gratings | Gratings | | | | | | | | | | |
|---|---|---|---|---|---|---|---|---|---|---|---|
| | 1 | 2 | 3 | 4 | 5 | 6 | 7 | 8 | 9 | 10 | 11 |
| widths of w1, w2 (μm) | 0.6 | 0.6 | 0.5 | 0.4 | 0.5 | 0.6 | 0.6 | 0.5 | 0.4 | 0.4 | 0.4 |
| depths of d1, d2 (μm) | 1.3 | 0.8 | 0.9 | 0.8 | 1.1 | 1.0 | 1.2 | 1.0 | 0.7 | 0.8 | 0.8 |

TABLE 1-continued

Dimensions of gratings on the first grating surface and the second grating surface of the intermediate layer of the light redirecting film

| Dimensions of gratings | Gratings | | | | | | | | | | |
|---|---|---|---|---|---|---|---|---|---|---|---|
| | 1 | 2 | 3 | 4 | 5 | 6 | 7 | 8 | 9 | 10 | 11 |
| grating gaps of g1, g2 (μm) | 0.6 | 0.6 | 0.6 | 0.4 | 0.4 | 0.6 | 0.4 | 0.6 | 0.5 | 0.5 | 0.4 |

Example 2

In Example 2, a light redirecting film 10 is provided. The light redirecting film 10 of this example comprises an intermediate layer 14 having a first grating surface 14a and a second grating surface 14b, and a plurality of grating structures, such as gratings 1~11, with various dimension and patterns as listed in Table 1 are sequential and repeatedly formed on the first grating surface 14a, and a plurality of grating structures, such as gratings 12~20, with various dimension and patterns as listed in Table 2 are sequential and repeatedly formed on the second grating surface 14b respectively, wherein the first grating surface 14a and the second grating surface 14b of the intermediate layer 14 are of different dimensions and patterns, and the first grating direction (D1) of the first grating surface 14a and the second grating direction (D2) of the second grating surface 14b cross at an angle of 90°. The refraction indexes of the first layer 12, the intermediate layer 14 and the second layer 16 of the light redirecting film are 1.5, 1.6 and 1.5, respectively. More or less gratings formed on the first grating surface 14a and the second grating surface 14b can also be generated according to this present invention.

TABLE 2

Dimensions of gratings on the second grating surface of the intermediate layer of the light redirecting film

| Dimensions of gratings | Gratings | | | | | | | | |
|---|---|---|---|---|---|---|---|---|---|
| | 12 | 13 | 14 | 15 | 16 | 17 | 18 | 19 | 20 |
| widths of w2 (μm) | 0.7 | 0.7 | 0.7 | 0.81 | 0.81 | 0.81 | 1.28 | 1.28 | 1.28 |
| depths of d2 (μm) | 0.9 | 0.9 | 0.9 | 0.9 | 0.9 | 0.9 | 1.0 | 1.0 | 1.0 |
| grating gaps of g2 (μm) | 0.7 | 0.7 | 0.7 | 0.81 | 0.81 | 0.81 | 1.28 | 1.28 | 1.28 |

Gamma-value is an index reflecting to the contrast ration and color saturation of a display. Higher gamma-value represents that the display provides a better contrast ratio and more saturated color.

The LC display used for measuring the gamma-value is 50″ HERAN 504K-C1(296H01) with 3840×2160 resolution. The gamma-values at different horizontal angles of a LC display with a light redirecting film of the present invention and a LC display without the present light redirecting film, as comparative example, are measured and showed in the following Table 3. The light redirecting films of Examples 1 to 2 are attached in front of the LCD.

TABLE 3

The gamma value at different horizontal viewing angles

| | Horizontal viewing angle | | | | | | | | |
|---|---|---|---|---|---|---|---|---|---|
| | 0° | 10° | 20° | 30° | 40° | 50° | 60° | 70° | 80° |
| Comparative example | 2.24 | 2.03 | 1.71 | 1.44 | 1.23 | 1.07 | 0.94 | 0.87 | 0.87 |
| Example 1 | 1.81 | 1.74 | 1.60 | 1.43 | 1.27 | 1.13 | 1.02 | 0.96 | 0.99 |
| Example 2 | 1.88 | 1.81 | 1.63 | 1.46 | 1.29 | 1.14 | 1.03 | 0.97 | 1.00 |

The data shown in Table 3 indicate that the light redirecting films of Examples 1 to 2 can improve the contrast ratio and color saturation at horizontal viewing angles from 40° to 80°, compared to the LCD without the light redirecting film of this invention.

The gamma-values at different vertical angles of a LC display with a light redirecting film of the present invention and a LC display without the present light redirecting film, as comparative example, are measured and showed in the following Table 4.

TABLE 4

The gamma-values at different vertical viewing angles

| | Vertical viewing angle | | | | | | | | |
|---|---|---|---|---|---|---|---|---|---|
| | 0° | 10° | 20° | 30° | 40° | 50° | 60° | 70° | 80° |
| Comparative example | 2.24 | 1.91 | 1.58 | 1.32 | 1.14 | 0.99 | 0.87 | 0.81 | 0.80 |
| Example 1 | 1.81 | 1.72 | 1.54 | 1.37 | 1.21 | 1.09 | 1.01 | 0.95 | 0.97 |
| Example 2 | 1.88 | 1.77 | 1.57 | 1.38 | 1.23 | 1.12 | 1.03 | 0.96 | 0.96 |

From the results of Examples 1 to 2 and Comparative Examples, the data shown in Table 4 indicate that the light redirecting films of Examples 1 to 2 attached in front of the LCD can enhance the contrast ratio and color saturation at vertical viewing angles from 30° to 80°, compared to the LCD without the light redirecting film.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A light redirecting film in a sandwich-laminated structure, comprising:
    a first layer having a first refraction index of n1;
    a second layer having a third refraction index of n3; and
    an intermediate layer having a second refraction index of n2, disposed between the first layer and the second layer, including a first grating surface having a plurality of first gratings extending in a first grating direction and a second grating surface opposite to the first grating surface having a plurality of second gratings extending in a second grating direction, wherein the first grating direction and the second grating direction cross each other at an angle of 90°±10°;
    wherein the first grating surface and the second grating surface of the intermediate layer are gap-filled and planarized with the first layer and the second layer respectively, and n2 is greater than n1 and n3, and when the light redirecting film is attached in front of the displaying side of a LCD, gamma values reflecting to the contrast ration and color saturation of the LCD are greater than 0.9 at different horizontal and/or vertical viewing angles ≤80 degrees.

2. The light redirecting film according to claim 1, wherein the first refraction index of n1, the second refraction index of n2, and the third refraction index of n3 are all in the range of 1.4 to 1.7.

3. The light redirecting film according to claim 2, wherein n1 and n3 can be the same or different.

4. The light redirecting film according to claim 2, wherein the difference of n2 and n1 is no less than 0.1 and no more than 0.3.

5. The light redirecting film according to claim 2, wherein the difference of n2 and n3 is no less than 0.1 and no more than 0.3.

6. The light redirecting film according to claim 1, wherein each of the first gratings has a width of w1, each of the second gratings has a width of w2, and w1, w2 are independently in the range of 0.3 μm to 1.5 μm.

7. The light redirecting film according to claim 1, wherein each of the first gratings has a depth of d1, each of the second gratings has a depth of d2, and d1, d2 are independently in the range of 0.5 μm to 1.5 μm.

8. The light redirecting film according to claim 1, wherein the grating gap of g1 between adjacent two of the first gratings and the grating gap of g2 between adjacent two of the second gratings are independently in the range of 0.3 μm to 1.5 μm.

9. The light redirecting film according to claim 1, wherein the widths, the depths and the grating gaps of the first gratings and the second gratings can be the same or different.

10. The light redirecting film according to claim 1, further comprising an optical film adhered to the light redirecting film, wherein the optical film is selected from one of a group consisting of a polarizing film, a hard-coating film, a low reflective film, an anti-reflective film, an anti-glaring film and a protective film or combinations thereof.

11. A liquid crystal display (LCD) comprising:
    a liquid crystal panel; and
    a light redirecting film in a sandwich-laminated structure attached in front of the displaying side of the liquid crystal panel, comprising:
        a first layer having a first refraction index of n1;
        a second layer having a third refraction index of n3; and
        an intermediate layer having a second refraction index of n2, disposed between the first layer and the second layer, including a first grating surface having a plurality of first gratings extending in a first grating direction and a second grating surface opposite to the first grating surface having a plurality of second gratings extending in a second grating direction, wherein the first grating direction and the second grating direction cross each other at an angle of 90°±10°, and the first grating surface and the second grating surface of the intermediate layer are gap-filled and planarized with the first layer and the second layer respectively, and n2 is greater than n1 and n3;
    wherein, gamma values reflecting to the contrast ration and color saturation of the liquid crystal display (LCD)

are greater than 0.9 at different horizontal and/or vertical viewing angles ≤80 degrees.

12. The liquid crystal display (LCD) according to claim 11, wherein the first refraction index of n1, the second refraction index of n2, and the third refraction index of n3 are all in the range of 1.4 to 1.7.

13. The liquid crystal display (LCD) according to claim 11, wherein the difference of n2 and n1 is no less than 0.1 and no more than 0.3.

14. The liquid crystal display (LCD) according to claim 11, wherein the difference of n2 and n3 is no less than 0.1 and no more than 0.3.

15. The liquid crystal display (LCD) according to claim 11, wherein each of the first gratings has a width of w1, each of the second gratings has a width of w2, and w1, w2 are independently in the range of 0.3 μm to 1.5 μm.

16. The liquid crystal display (LCD) according to claim 11, wherein each of the first gratings has a depth of d1, each of the second gratings has a depth of d2, and d1, d2 are independently in the range of 0.5 μm to 1.5 μm.

17. The liquid crystal display (LCD) according to claim 11, wherein the grating gap of g1 between adjacent two of the first gratings and the grating gap of g2 between adjacent two of the second gratings are independently in the range of 0.3 μm to 1.5 μm.

18. The liquid crystal display (LCD) according to claim 11, wherein the widths, the depths and the grating gaps of the first gratings and the second gratings can be the same or different.

19. The liquid crystal display (LCD) according to claim 11, further comprising an optical film adhered to the light redirecting film, wherein the optical film is selected from one of a group consisting of a polarizing film, a hard-coating film, a low reflective film, an anti-reflective film, an anti-glaring film and a protective film or combinations thereof.

* * * * *